(12) United States Patent
Fahmi et al.

(10) Patent No.: US 11,408,809 B2
(45) Date of Patent: Aug. 9, 2022

(54) STUCK-BALL METHOD TO DELINEATE GELATION TIME

(71) Applicant: SAUDI ARABIAN OIL COMPANY, Dhahran (SA)

(72) Inventors: Mohanad M. Fahmi, Al Khobar (SA); Abdulkareem M. Alsofi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/076,251

(22) Filed: Oct. 21, 2020

(65) Prior Publication Data
US 2022/0120652 A1 Apr. 21, 2022

(51) Int. Cl.
*G01N 11/02* (2006.01)
*G01N 11/12* (2006.01)
*C08F 120/56* (2006.01)

(52) U.S. Cl.
CPC ............ *G01N 11/12* (2013.01); *C08F 120/56* (2013.01)

(58) Field of Classification Search
CPC .... G01N 11/12; G01N 11/10; G01N 33/4905; G01N 11/00; G01N 33/86; C08F 120/56
USPC .................................. 73/64.41, 54.15, 54.19
See application file for complete search history.

(56) References Cited

U.S. PATENT DOCUMENTS

| | | | |
|---|---|---|---|
| 2,731,828 A | 1/1956 | Parrette et al. | |
| 3,967,934 A * | 7/1976 | Seitz | G01N 11/10 422/73 |
| 4,276,383 A * | 6/1981 | Leighton | G01N 21/253 435/288.1 |
| 4,957,166 A | 9/1990 | Sydansk | |
| 5,211,054 A | 5/1993 | Muramatsu et al. | |
| 9,909,968 B2 | 3/2018 | Abhishek et al. | |
| 10,105,465 B2 | 10/2018 | Lee et al. | |
| 2005/0015000 A1* | 1/2005 | Djennati | G01N 33/4905 600/369 |

(Continued)

FOREIGN PATENT DOCUMENTS

WO 2015038998 A1 3/2015

OTHER PUBLICATIONS

Raghavan, Srinivasa R. and Bani H. Cipriano, "Gel Formation: Phase Diagrams Using Tabletop Rheology and Calorimety", Eds. R.G.Weiss and P. Terech, Molecular Gels. Materials with Self-Assembled Fibrillar Networks, Chapter 8, 2006, pp. 241-252 (12 pages).

(Continued)

*Primary Examiner* — Robert R Raevis
(74) *Attorney, Agent, or Firm* — Osha Bergman Watanabe & Burton LLP

(57) ABSTRACT

Methods for determining the gelation period of a gel solution are provided. The methods provided include introducing an inert ball into each of a plurality of gel solution containers having a gel solution therein. In the method, the inert balls are then allowed to sink to the bottom of the containers, followed by a step of repeatedly inverting a first gel solution container at specified time intervals until the onset of gelation of the first gel solution is observed. Methods further include repeatedly inverting an additional gel solution container at specified intervals where each of the subsequent gel solution containers containing the inert balls and gel solutions are sequentially inverted in series until the inert ball is observed to remain fixed in place in the solution.

18 Claims, 1 Drawing Sheet

(56) References Cited

U.S. PATENT DOCUMENTS

2005/0255535 A1* 11/2005 Yin ........................ G01N 33/86
435/13

OTHER PUBLICATIONS

Sanchez, Angel, "Colorimetric method for the estimation of sol-gel transition of cellulose nanofibrils suspensions", YouTube, Feb. 21, 2017, URL:<https://www.youtube.com/watch?v=asTc4hVJhPk> (video).

Ng, Keng Wooi, "Temperature-sensitive gel", YouTube, Sep. 20, 2018, URL:<https://www.youtube.com/watch?v=N9AAwaL5TrE&list=WL&index=658t=0s> (video).

Hayashi, Yoshihiro and John B. Blum, "Sol-gel derived PbTiO3: Part 2Structural control of monolithic gels", Journal of Materials Science, SpringerLink, vol. 22, Jul. 1987, pp. 2655-2660 (6 pages).

Iwata, Shuichi et al., "Viscosity measurement of gelcasting slurry during in-situ gelation by a micro X-ray CT scan system", Ceramic International, SciVerse ScienceDirect, Elsevier Ltd., vol. 39, Dec. 2012, pp. 5309-5316 (8 pages).

AlSofi, A. et al., "Portrayal and Demonstration of a Novel Procedure for In-Situ Estimation of Gelation Time", European Association of Geoscientists & Engineers, EAGE Publications BV, Conference Proceedings, IOR 2019—20th European Symposium on Improved Oil Recovery, Apr. 2019, pp. 1-8 (8 pages).

Grattoni, Carlos A. et al., "Rheology and Permeability of Cross-linked Polyacrylamide Gel", Journal of Colloid and Interface Science, Academic Press, vol. 240, Jul. 2001, pp. 601-607 (7 pages).

Bansil, Rama et al., "Effects of gelation on spinodal decomposition kinetics in gelatin", Polymer, Butterworth-Heinemann Ltd., vol. 33, No. 14, 1992, pp. 2961-2969 (9 pages).

Brunelle, Éric et al., "Gelation time in the discrete coagulation-fragmentation equations with a bilinear coagulation kernel", Journal of Physics A: Mathematical and Theoretical, IOP Publishing, vol. 40, Sep. 2007, pp. 11749-11764 (16 pages).

Crisp, Stephen et al., "Gelation of Polyacrylic Acid Aqueous Solutions and the Measurement of Viscosity", Journal of Dental Research, vol. 54, Issue 6, Nov. 1975, pp. 1173-1175 (3 pages).

Dai, Bona and Shingo Matsukawa, "NMR studies of the gelation mechanism and molecular dynamics in agar solutions", Food Hydrocolloids, ScienceDirect, Elsevier Ltd., vol. 26, 2012, pp. 181-186 (6 pages).

Dumas, J. and J.-C. Bacri, "New method of viscosity measurement near the gelatin sol-gel transition", Journal de Physique Archives, vol. 41, No. 12, Jun. 1980, pp. 279-282 (4 pages).

Gaides, G.E. and A.J. McHugh, "Gelation in an amorphous polymer: a discussion of its relation to membrane formation", Polymer, Butterworth & Co. (Publishers) Ltd., vol. 30, Nov. 1989, pp. 2118-2123 (6 pages).

Houari, Ahmed, "Determining the viscosity of liquids using an extended falling ball method", Physics Education, IOP Publishing Ltd, vol. 46, No. 6, Nov. 2011, pp. 688-691 (5 pages).

Huang, H. and C. M. Sorensen, "Shear effects during the gelation of aqueous gelatin", Physical Review E, The American Physical Society, vol. 53, No. 5, May 1996, pp. 5075-5079 (4 pages).

Wang, Jian et al., "A computer-interfaced falling ball viscometer", Journal of Biochemical and Biophysical Methods, Elsevier Science B.V., vol. 28, 1994, pp. 251-261 (11 pages).

* cited by examiner

STUCK-BALL METHOD TO DELINEATE GELATION TIME

BACKGROUND

Gelation-time is a key screening parameter in developing potential gel formulations. The gelation time of a gel solution formulation may be conventionally defined as the point at which the gel solution of a polymer and a crosslinker form a gel. From such a definition, the subjectivity of this parameter is clearly demonstrated. Although less subjective methods have been utilized, such as those based on NRM or rheology, the conventional methods for estimating gelation time remain limited to more subjective bottle tests. In such bottle tests, the Sydnax scale is most widely used and provides the conventionally adopted approach for the characterization of gelation-states and the corresponding estimation of gelation time. In using the Sydnax scale, various states (A to J) are defined to represent the observed conditions upon the inversion of a gelant sample, in a bottle.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods for determining the gelation period of a gel solution. Such methods may include introducing an inert ball into each of a plurality of gel solution containers having a gel solution therein and allowing the inert ball to sink to the bottom of the containers. Methods may further include repeatedly inverting a first gel solution container at specified time intervals and once the start of gelation of the first gel solution is observed, repeatedly inverting an additional gel solution container at specified intervals, where subsequent gel solution containers containing the inert balls and gel solutions are sequentially inverted in series until the inert ball is observed to remain fixed in place in the solution.

In another aspect, embodiments disclosed herein relate to methods for determining the gelation period of a gel solution. Such methods may include introducing an inert ball into each of a plurality of gel solution containers having a gel solution therein and allowing the inert ball to sink to the bottom of the containers. Methods may further include repeatedly inverting a first gel solution container at specified time intervals and once the start of gelation of the first gel solution is observed, repeatedly inverting an additional gel solution container at specified intervals, where the specified time intervals become shorter for each subsequent gel solution. In the methods, the subsequent gel solution containers containing the inert balls and gel solutions may be sequentially inverted in series until the inert ball is observed to remain fixed in place in the solution.

Other aspects and advantages of the claimed subject matter will be apparent from the following description and the appended claims.

DETAILED DESCRIPTION

One or more embodiments disclosed herein relate to a methodology to measure gelation times. Embodiments may relate to methods that include the incorporation of a falling-ball in a confined system through a gel medium, where the movement of the ball upon inversion of the confined system of the medium may be a clearer indication of the gelation of the gel medium, which may provide a direct measure of gelation time.

One or more embodiments of the present disclosure relate to methods that include falling-ball and bottle test to better determine gel solution gelation times. One or more embodiments may relate to improvements in the methodology of gelation bottle tests to reduce subjectivity associated with conventional techniques and yield more accurate estimates of gelation properties. The method relies on the incorporation of a ball in the tested fluid where upon inversion of the test tube, the movement of the ball will be a clearer indication of gelation. This approach provides a less subjective basis for defining the onset of gelation compared to traditional approaches that rely on visual inspection and classification of the gelation states.

One or more embodiments provided in the present disclosure relates to improvements in the methodology of bottle tests to reduce subjectivity associated with conventional techniques and yield more accurate estimates. Methods may rely on the incorporation of a ball in the tested fluid where the movement of the ball upon the inversion of the test tube will be a clearer indication of gelation. Such methods may provide a less subjective basis for defining the onset of gelation compared to traditional approaches that rely on visual inspection and conventional classification of the gelation states.

One or more embodiments of the present disclosure relate to a method for determining the gelation time of a gel solution. The method may include a container of a selected height and width and a ball of a selected material, size, and density. The container of a selected height and width may hold or comprise a gel solution that may be reacted for a specific period of time and under specific reaction conditions to form a gel phase. In one or more embodiments of the present disclosure, a method as described herein may be employed to determine the gelation time of the gel solution based upon the movement of an inert ball in a gel solution upon inversion of the gel solution container.

The gel solution may be in a fluid or semi-fluid state and may have an initial viscosity that has been measured or pre-determined. The one or more inert ball may have density that is known to be greater than the density of the gel solution. In this state, the inert balls may travel or sink through the gel solution to the opposite end of the gel solution container. As the gel solution begins to polymerize, the viscosity of the gel solution will increase, and the inert ball's movement through the gel solution will decrease, or otherwise be altered.

Figure 1A:
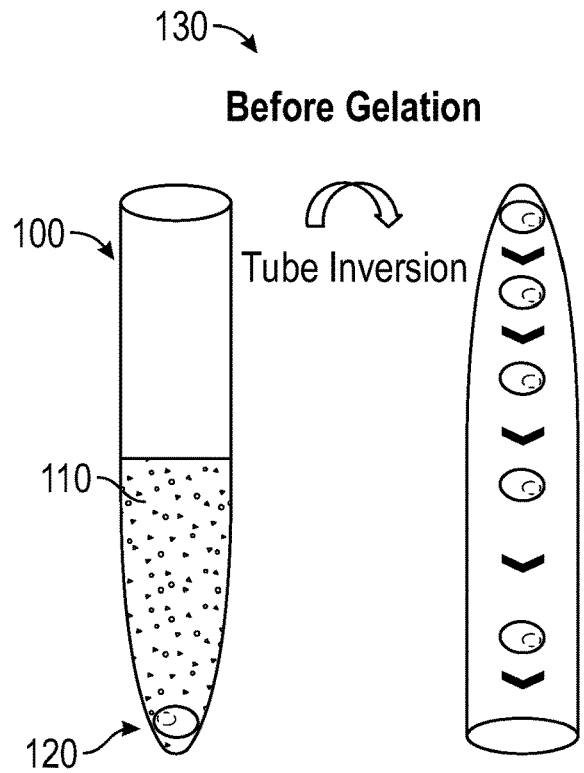
FIGS. 1A and 1B show an example schematic of a gel solution container and the inversion of the gel container both before (FIG. 1A) and after (FIG. 1B) gelation.
Figure 1B:
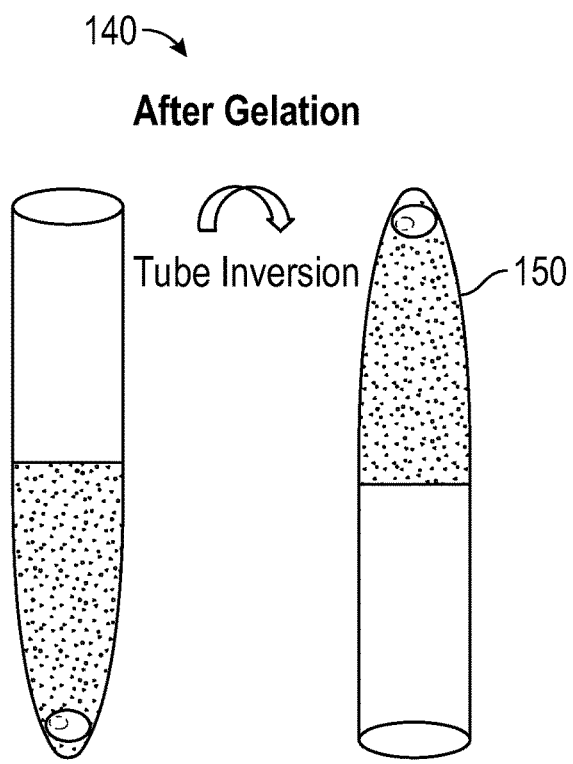

FIG. 1 shows a schematic of a gel solution container being inverted both before gelation (FIG. 1A) and after gelation (FIG. 1B). The schematic of FIG. 1A shows, from left to right, the inversion of the gel solution container 100 including the inert ball 120 through the gel medium 110, such as a gel solution. As shown in FIG. 1A, prior to gelation, and when the gel is in a solution phase, the inert ball 120, and the gel medium 110, will freely move to the opposite end of the gel solution container. FIG. 1B shows that as the gel solution polymerizes, and the viscosity of the gel solution increases, the inert ball's 120 travel through the gel solution 110 may be altered. After gelation 140, when the gel solution container 100 is inverted, the inert ball 100 and gelled solution 150 will remain "stuck" in place at the bottom of the gel solution container 100. This observation indicates that the gel solution has fully polymerized and formed a gel phase 150. The time to reach this observation may be recorded as the gelation time of the gel solution.

The methods of one or more embodiments of the present disclosure may include a series of sequential steps where said steps may be initiated after specified periods and or points of observation. Generally, the method may be outlined by steps including a first step where a plurality of gel solutions are prepared in a plurality of gel solution containers. The gel solutions may comprise a polymer gel and a reactive cross-linker. Each gel solution may comprise the same type and amount of each polymer and reactive cross-linker, such that the gel solutions may be replicates of one another. After the preparation of a plurality of replicate test gel solutions, an inert ball may be dropped in each of the prepared gel solutions. Due to gravity and density differences between the inert balls and the gel solutions, the inert balls will sink and settle down at the bottom of each gel solution container. Following the insertion of the inert balls in the gel solutions, the plurality of gel solution containers, containing the gel solutions and the inert balls may then be placed in an oven that is provided to maintain a specific temperature. The specified temperature may be selected based upon the specific reaction properties of gel solution.

At this stage, a first replicate sample containing the gel solution may be periodically and/or repeatedly inverted at predesignated time intervals. In some embodiments this "inversion" may be conducted by manually inverting the gel solution container and observing whether or not the inert ball moves within the gel solution. At an initial time and prior to any gelation of the gel solution, the inert ball may generally freely "fall" through the gel solution and will then settle back to the bottom of the gel solution container upon re-inversion. As the polymerization reaction proceeds, and upon inversion, the inert ball may be observed to become partially stuck or partial gelation may be observed. With this observation, the test will proceed to a subsequent additional replicate. This partial gelation indicates the onset and progression of the polymerization reaction where the solution phase may begin to experience an increase in viscosity. As the reaction proceeds further the same conditional observation will be made. At each step where the gel solution container is inverted, if the inert ball appears to become partially stuck, the sample will be placed back in the oven, and the test will proceed to a subsequent replicate sample. The test will conclude when, after inversion, the ball remains stuck at the bottom of the tube upon inversion then full gelation took place. At this stage, the gelation time will be recorded.

In one or more embodiments the methods may include preparing a number of gel solution replicates by placing an inert ball in a gel solution comprised within a gel solution container, and preparing replicate samples of identical gel solutions that may each comprise identical inert balls.

Introduction of Ball

In one or more embodiments, the method may include a step of introducing an inert ball into each of the plurality of the gel solution containers comprising a gel solution and a polymerization cross-linker reactant. In one or more embodiments the one or more inert balls may be manually placed in the gel solution container at the surface of the gel solution.

In one or more embodiments, additional inert balls may be introduced into each of the replicate gel solution containers containing a gel solution including at least a polymer and a reactive cross-linker. In such embodiments the additional inert balls may be introduced simultaneously, or almost simultaneously, where the additional inert balls are each introduced into the gel solution and allowed to sink the bottom of the gel solution container. The one or more subsequent inert balls may be deployed simultaneously into each of the gel solution containers to determine the gelation time of gel solutions with extended gelation periods.

In the method of one or more embodiments, the inert ball may travel through the gel solution at a certain velocity. After the ball is introduced into the gel solution it may travel through the gel until reaching the bottom of the container. At this point, the plurality of gel solution containers may be placed in a temperature controlled environment, such as an oven, and the polymerization reaction may proceed. Each of the respective inert balls may be of identical density and size. At selected time intervals, the gel solution container may be inverted, and the inert ball's movement through the gel solution may be observed. If the ball appears to be partially stuck, or any other partial gelation is observed, upon inversion or re-inversion, the test will proceed to the subsequent replicate gel solution. This process may be repeated until a final inert ball remains fixed in place in the gelled solution upon inversion of the gel solution container.

In one or more embodiments, the number of replicate test samples prepared may range from 3 to 10, and in some embodiments the number of replicate test samples prepared may range from 3 to 6. In one or more embodiments, the time interval between inversions may vary and the test gel solutions may be inverted more frequently as the reaction progress. Accordingly, the number of replicates required to determine the gelation time of the gel solution may vary with the estimated gelation time. In one or more embodiments, the first gel solution sample may be checked (inverted) more than once, as it is used for the first observation, while other subsequent sample replicates may be inverted once or twice at maximum. The frequency of the sample inversions may be increased during the final 10-15% of the pre-estimated gelation time to occur in time increments that may range from 30% to 50% of original time increments between inversions that occurred in the first 85% to 90% of the gelation reaction. For instance, if the total gelation time is about 5 hours, the time interval may decrease from every 30-60 min for the first 3.5 hours to every 10-15 min for the remaining time. In one or more embodiments, and depending on the estimated gelation period, generally about 5-6 replicates may be needed to determine the gelation time of a gel solution.

Inert Ball

In one or more embodiments, the size, material, and density of the ball may partially dictate the manner and velocity at which the inert ball passes through the gel solution during a gelling process. These features of the ball may be specifically selected and controlled based upon the properties of the gel solution to be studied. For example, the inert ball may be at a selected density that is greater than the density of the initial gel solution. The inert ball may also be comprised of a material with at least an outer layer or shell that is unreactive and incapable of dissolving within the gel solution. The ball may also be chemically unreactive to avoid altering the polymerization or reaction of the polymer gel whose gelation is being studied.

In one or more embodiments, the inert ball may have a radius that ranges from a lower limit of any of 0.2, 0.5, 0.6, 0.7 or 0.9 millimeters (mm) to an upper limit of any of 1.0, 1.1, 1.2, 1.3, or 1.5 mm, where any lower limit can be used in combination with any mathematically compatible upper limit. As discussed, the radius of the inert ball may be specifically selected based upon the diameter or dimensions of the gel solution container. In one or more embodiments, the ball may have a radius of a size such that the ball is not affected by the walls of the container or vial in which it will be placed yet may be visible to the naked eye. In one or more embodiments, the ball may be substantially spherical so that the movement through the polymer gel solution is unimpacted by orientation of the ball as it falls. The properties of the gel solution and the travel of the ball may be adversely affected at the proximal edges or walls of the gel solution container. Thus, the gel solution container should be sufficiently large enough so that the walls of the container are separated from the outer surface of the inert ball. The size of the ball is also related to the ultimate density of the ball and may be selected in combination with the consideration of the specific material of the ball and the properties of the gelation solution. As described, the density of the gel solution may be less than the density of the one or more inert balls.

In embodiments as described previously, multiple inert balls may be employed in replicate identical gel solution samples, particularly when measuring the gelation time of gel solutions with longer gelation periods. In such embodiments, each inert ball may have an identical size, shape, material, and corresponding density.

Material of Ball

In one or more embodiments, the ball may be comprised of a sufficiently inert and unreactive material that is also insoluble so as not to affect or alter the polymerization of the gel solution. In one or more embodiments the inert ball may be comprised of a metal or glass. In one or more embodiments, the ball may be comprised of a material such as steel, silica, carbon, stainless steels, refractory metals, certain ceramic, or a mixture thereof.

In one or more embodiments the one or more inert balls may have a density that is between 0.1% and 50% greater than the density of the polymer gel solution. In one or more embodiments, the inert balls may have density greater than the density of the polymer gel solution being tested ranging from a lower limit of any of 0.1, 5, 10, 20, 30, and 35% to an upper limit of any of 3, 5, 7, 10, 20, 30, 40, 45, and 50%, where any lower limit may be combined with any mathematically feasible upper limit.

In one or more embodiments, the inert balls may have density greater than the density of the polymer gel solution. In one or more embodiments the one or more inert balls may have a density that is between 0.01% and 5% greater than the density of the polymer gel solution. In one or more particular embodiments the inert ball may have a density that greater than density of the gel solution. In some embodiments the inert ball may have a density that is less than 10% greater than the density of the gel solution. In yet other embodiments the inert ball may have a density that is less than 5% greater than the density of the gel solution.

In one or more embodiments of the present disclosure, the gel solution container should be comprised of an inert and unreactive material. The gel solution container may be comprised of glass material that has a high degree of transparency. The gel solution container should allow for clear observation of the gel solution and the inert ball. In one or more embodiments, the gel solution container may be comprised of a material that is stable and unreactive, both physically and chemically at temperatures up to 100° C. In one or more embodiments, the gel solution container may be comprised of a material such as glass or plastic.

In one or more embodiments the gel solution container should be of cylindrical shape and may have an ovoid or oval shaped bottom, or a flat bottom. In one or more embodiments, the diameter of the gel solution container is not specifically limited, but should be sufficiently large enough to not impede or affect the movement of the inert ball as it passes through the solution, as described. In one or more embodiments the height of the gel solution container is not particularly limited, though the gel solution container may be of a height and diameter that large amounts of the gel solution polymer and cross linker are not required or wasted.

In one or more embodiments, the polymerization reaction may require increased temperatures to catalyze or conduct the polymerization reaction. The method according to one or more embodiments of the present disclosure may be conducted under ambient conditions or at elevated and controlled temperatures that may range up to 100° C., such as at 90 or 95° C. In one or more embodiments, the gelation tests may be conducted in an oven to provide more precise control of the temperature of the gelation reaction.

In one or more embodiments, the gel solution container may be graduated or marked in millimeter and/or centimeter increments to provide reference points for the distance traveled by the inert ball through the gel solution. In one or more embodiments, the distance traveled by the inert ball may be measured by the change in position of the bottom most-point of the inert ball in the gel solution.

Inversion of Gel Solution Containers

As described, in one or more embodiments, after being placed in a temperature controlled environment, the gel solutions may be periodically checked at selected time intervals. During this step, a first gel solution container may be inverted, and the inert ball's movement through the gel solution may be observed. If the ball appears to be partially stuck, or any other partial gelation is observed, upon inversion or re-inversion, the test will proceed to a subsequent replicate gel solution. From this point, this process may be repeated until a final check results in the observation of an inert ball that remains fixed in place in the gelled solution upon inversion of the gel solution container.

As described previously, in one or more embodiments, the inversion of the gel solution containers may be conducted at pre-designated intervals with a specific frequency that is selected based upon the theoretical gelation time. In one or more embodiments, the gel solution may be checked and inverted at time intervals ranging from 1 minute (min) to 30 min depending on the total pre-estimated gelation time. In some embodiments, the time between checks may vary throughout the reaction and the test gel solutions may be checked more frequently as the reaction progresses. As previously discussed, the frequency of the sample inversions may be increased during the final 10-15% of the pre-estimated gelation time so that they occur in time increments that may range from 30% to 50% of original time increments between checks (inversions) that occurred in the initial 85% to 90% of the gelation reaction. For example, if the total gelation time is estimated to be about 5 hours, the gel solution container may be inverted every 30 min for the first 3.5 hours, and then every 10 to 15 min for the duration of the gelation reaction. In one or more embodiments, the time between inversion may be reduced during the last 10-15% of the pre-estimated gelation time.

In one or more embodiments, the inversion of the gel solution containers may include inverting the gel solution container at 180 degrees so that the original bottom of the gel solution container is directly above the original top. The gel solution container may be inverted for a period of time that is sufficient to observe the inert ball travel completely through the gel solution, or for a period of time that is long enough to observe that the inert ball is partially stuck in the gel solution, or for a period of time that is long enough to observe other characteristics that indicate partial gelation of the gel solution.

In one or more embodiments, the observed and recorded gelation times may be stored in a database. Such a database may then serve as a reference library for fast and simple identification of any subsequently studied potential systems and concentrations ranges for use any future treatment of a given reservoir. Additionally, the recorded and stored gelation time may also be utilized in upscaling efforts to evaluate and design a potential treatment plan for a reservoir. Such upscaling can be numerical using reservoir simulation using a simulator that model gelation or even a simulator that do not capture the process through proper reconditioning of restart permeability files. Otherwise analytical or back of the envelope engineering approaches can be used for rough upscaling.

After collecting the gelation times of the specific gel solutions, the data may be stored. This stored data may be further used as a reference point for future modification of the specific polymer gel system. Further modifications may include, but are not limited to, varying the concentrations of both the polymer and cross-linker or the type of polymer or cross-linker, to modify the gelation time. Using the method of one or more embodiments of the present disclosure, the gelation time of polymer systems may be studied and reliably compared within the stored database. For example, additional modifications to the gel solution may include adding a retarder with varying concentration to the gel solution including the polymer and cross-linker, and recording the change in gelation time or characteristic that results. This method may be used to generate a library of gelation times for varying polymer systems with related reaction conditions. Such library may serve to provide greater insight into the effects of employing different chemistries within the cross-linker component (e.g. organic and inorganic), in addition to providing a broader reference library of gelation times for polymer systems with varied properties relating to sulfonation, molecular weight, and hydrolysis.

This particular disclosure is not specifically limited to any polymer and/or cross-linker combination. Rather, the present disclosure is provided to disclose methods relating to the precise determination of the gelling time of gel solution formulations that may experience any duration of gelation time.

The methods and systems provided in one or more embodiments of the present application may generally apply to polymer gel solutions that may be used in a reservoir or drilling well where crosslinking, or more generally, polymer gelation, occurs during the course of treatment. For example, determining gelation times of a polymer gel solution may be particularly advantageous for selecting a specific gelling solution for use as near wellbore treatments to divert acid stimulations or fracturing fluid, or to develop deep fluid diversion technologies.

EXAMPLES

The following examples are illustrative and should not be interpreted as limiting the scope of the present disclosure. The following example is provided to demonstrate how a gelation time may be calculated based upon the methods described in one or more embodiments of the present disclosure.

Example 1 demonstrates the improved methodology of gelation bottle tests and its ability to reduce subjectivity associated with Sydnax technique while also yielding more accurate estimates of gelation properties throughout the gelation period.

The test samples (A), (B1), (C1), (D1), and (E1) were identically prepared in Example 1. Each gel solution container comprised 30 mL of the test gel solution, 11500 ppm of a sulfonated polyacrylamide polymer (AN125) and 400 ppm of chromium. Each gel solution container consisted of a cylindrical glass structure with a height of 10 cm and a diameter of 2 cm. The inert sphere used in each test sample was comprised of steel and had a diameter of 2.5 mm. A comparative test sample was also prepared similarly to test samples used in the inversion gelation tests and was observed throughout the gelation period.

As shown in Table 1, the first test tube (A) was repeatedly inverted (A1 and A2) at specified time intervals. Once the initial stage of gelation of the first gel solution was observed, an additional gel solution (B1) was inverted at the specified intervals provided below. This process was continued, where subsequent gel solution containers containing the inert balls and gel solutions were sequentially inverted in series, as shown in C1 and D1, until the inert ball was observed to remain fixed in place in the gelled solution (E1). The results, observations and gelation times are provided alongside conventional Sydnax states (A to J) to demonstrate the accuracy and precision of the inversion technique detailed in the present disclosure.

TABLE 1

Experimental Results: Inversion Tests

| Gel Sample (Letter) | Cumulative Time (min) | Sydnax scale | Falling Ball observation Ball reached bottom/stuck? | Total Time (min) |
|---|---|---|---|---|
| A1 | 30 | A | Yes, very quick | 30 |
| A2 | 50 | B | Yes | 60 |
| B1 | 60 | C | Yes | 60 |
| C1 | 75 | C/D | Yes, but slightly sticky | 75 |
| D1 | 85 | D/E | Yes, after some time | 85 |
| E1 | 95 | F | No | 95 |

As shown in Table 1, the observations obtained from the inversion gelation method and indication of gelation are approximate to observation made using the conventional Sydnax scale where state F is obtained. State F of the Syndax scale provides that the gel is highly deformable nonflowing gel. Thus, instead of evaluating the solution within 10 different gel classifications, an easy and simple methodology using the gelation inversion test of the present disclosure may be used.

The conventional Sydnax approach shows that at different times, different definitions of gelation can be concluded. However, the method as described in one or more embodiments of the present disclosure provide the capability to observe strong and/or true gelation when the ball is trapped by the gel at the bottom of the tube, where it cannot travel anymore upon inversion.

Accordingly, under the described set-up, the gelation time may be accurately and more precisely determined from the sequential inversion of the gel solution containers throughout the gelation reaction.

The presently disclosed systems, apparatuses, methods, processes and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed as from about one particular value to about another particular value, inclusive. When such a range is expressed, it is to be understood that another embodiment is from the one particular value to the other particular value, along with all particular values and combinations thereof within the range.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for determining the gelation period of a gel solution comprising:
   introducing an inert ball into each of a plurality of gel solution containers having a gel solution therein;
   allowing the inert ball to sink to the bottom of the containers;
   repeatedly inverting a first gel solution container at specified time intervals; and
   once start of gelation of the first gel solution is observed, repeatedly inverting an additional gel solution container at specified intervals;
   wherein subsequent gel solution containers containing the inert balls and gel solutions are sequentially inverted in series until the inert ball is observed to remain fixed in place in the solution.

2. The method of claim 1, where the specified time intervals become shorter in a final 15% of the estimated gelation period.

3. The method of claim 1, wherein the gel solution containers are inverted at about 180 degrees, relative their original position.

4. The method of claim 1, wherein the gel solutions are inverted for a time period ranging from 1 minute (min) to 30 mins.

5. The method of claim 1, wherein the number of replicate gel solution ranges from 3 to 10.

6. The method of claim 1, wherein the ball has a radius ranging from 0.4 to 1.5 millimeters (mm).

7. The method of claim 1, wherein the ball is comprised of a material selected from the group consisting of steel, silica, carbon, stainless steels, refractory metals, certain ceramic, or a combination thereof.

8. The method of claim 1, wherein each inert ball has the same density and radius, and is prepared from the same material.

9. The method of claim 1, wherein the inert ball has a density that is less than 10% greater than the density of the gel solution, prior to gelation.

10. The method of claim 1, wherein the gel solution containers are placed in an oven to control the temperature of the gelation polymerization.

11. The method of claim 10, wherein the gelation polymerization is conducted at a temperature that is less than 100° C.

12. A method for determining the gelation period of a gel solution comprising:
    introducing an inert ball into each of a plurality of gel solution containers having a gel solution therein;
    allowing the inert ball to sink to the bottom of the containers;
    repeatedly inverting a first gel solution container at specified time intervals; and
    once start of gelation of the first gel solution is observed, repeatedly inverting an additional gel solution container at specified intervals, wherein the specified time intervals become shorter for each subsequent gel solution;
    wherein subsequent gel solution containers containing the inert balls and gel solutions are sequentially inverted in series until the inert ball is observed to remain fixed in place in the solution.

13. The method of claim 12, wherein the gel solutions are inverted for a time period ranging from 1 minute (min) to 30 mins.

14. The method of claim 12, wherein the number of replicate gel solution ranges from 3 to 10.

15. The method of claim 12, wherein the ball has a radius ranging from 0.4 to 1.5 millimeters (mm).

16. The method of claim 12, wherein the ball is comprised of a material selected from the group consisting of steel, silica, carbon, stainless steels, refractory metals, certain ceramic, or a combination thereof.

17. The method of claim 12, wherein each inert ball has the same density and radius, and is prepared from the same material.

18. The method of claim 12, wherein the gelation time is determined for the specific gel solution and the time is collected and stored in a database.

* * * * *